US010643337B2

(12) United States Patent
Krishnamurthy et al.

(10) Patent No.: US 10,643,337 B2
(45) Date of Patent: May 5, 2020

(54) SYSTEMS AND METHODS FOR SEGMENTING AND TRACKING PACKAGE WALLS IN COMMERCIAL TRAILER LOADING

(71) Applicant: SYMBOL TECHNOLOGIES, LLC, Lincolnshire, IL (US)

(72) Inventors: Adithya H. Krishnamurthy, Hicksville, NY (US); Justin F. Barish, Kings Park, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 279 days.

(21) Appl. No.: 15/853,129

(22) Filed: Dec. 22, 2017

(65) Prior Publication Data
US 2019/0197701 A1 Jun. 27, 2019

(51) Int. Cl.
*G06K 9/00* (2006.01)
*G06T 7/246* (2017.01)
*G06T 7/11* (2017.01)
*H04N 13/204* (2018.01)

(52) U.S. Cl.
CPC ............... *G06T 7/246* (2017.01); *G06T 7/11* (2017.01); *H04N 13/204* (2018.05); *G06T 2207/10012* (2013.01)

(58) Field of Classification Search
CPC . G06T 7/246; G06T 7/11; G06T 2207/10012; H04N 13/204; H04N 13/271

USPC .......................................................... 382/103
See application file for complete search history.

(56) References Cited

U.S. PATENT DOCUMENTS

| | | | |
|---|---|---|---|
| 9,460,524 B1* | 10/2016 | Curlander | G06Q 10/08 |
| 2013/0342653 A1* | 12/2013 | McCloskey | G01S 17/026 |
| | | | 348/46 |
| 2014/0372183 A1* | 12/2014 | Groble | G06Q 50/28 |
| | | | 705/7.38 |
| 2016/0047646 A1* | 2/2016 | Ochsendorf | G01B 11/28 |
| | | | 348/148 |
| 2016/0297361 A1* | 10/2016 | Drazan | H04N 7/181 |
| 2017/0349166 A1* | 12/2017 | Anderson | B60W 30/02 |
| 2019/0003832 A1* | 1/2019 | Elmouttie | G01C 11/06 |

* cited by examiner

*Primary Examiner* — Van D Huynh
(74) *Attorney, Agent, or Firm* — Yuri Astvatsaturov

(57) ABSTRACT

Three-dimensional (3D) imaging systems and methods for segmenting and tracking package walls in commercial trailer loading are described. A 3D-depth camera is oriented in a direction to capture 3D image data of a vehicle storage area. A first portion of the 3D image data is captured by the 3D-depth camera during a first time period and a second portion of the 3D image data is captured by the 3D-depth camera during a second time period. A segmentation application (app) determines, based on the 3D image data, a first data wall slice corresponding to a first package wall and a second data wall slice corresponding to a second package wall, where each of the first package wall and the second package wall is defined by a plurality of packages each having a respective similar depth dimension and each packed within the vehicle storage area during a respective time period.

22 Claims, 7 Drawing Sheets

US 10,643,337 B2

SYSTEMS AND METHODS FOR SEGMENTING AND TRACKING PACKAGE WALLS IN COMMERCIAL TRAILER LOADING

BACKGROUND OF THE INVENTION

When packages, boxes, or other transportable good or objects are loaded into commercial trailers, in order to achieve maximum packing efficiency, such packages, boxes, or other transportable good or objects are typically stacked to form separate "package walls" inside the trailer. If too many, or too few, package walls are constructed, this may increase shipping costs because fewer packages, boxes, or other transportable good or objects are able to be loaded onto a trailer, thereby, requiring additional shipments and logistic costs than otherwise needed with more efficiently packed trailers. Such practices may also signal poor loading habits by workers or loaders arranging the package walls within the trailer. In addition, as package walls are constructed from the rear of the trailer storage area to the front of the trailer storage area, each consecutive package wall covers or blocks the previous one, preventing dock managers from seeing it, and otherwise fixing, or facilitating, more efficient arrangements of package walls within the trailer storage area.

Accordingly, there is a need for segmenting and tracking package walls in commercial trailer loading.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
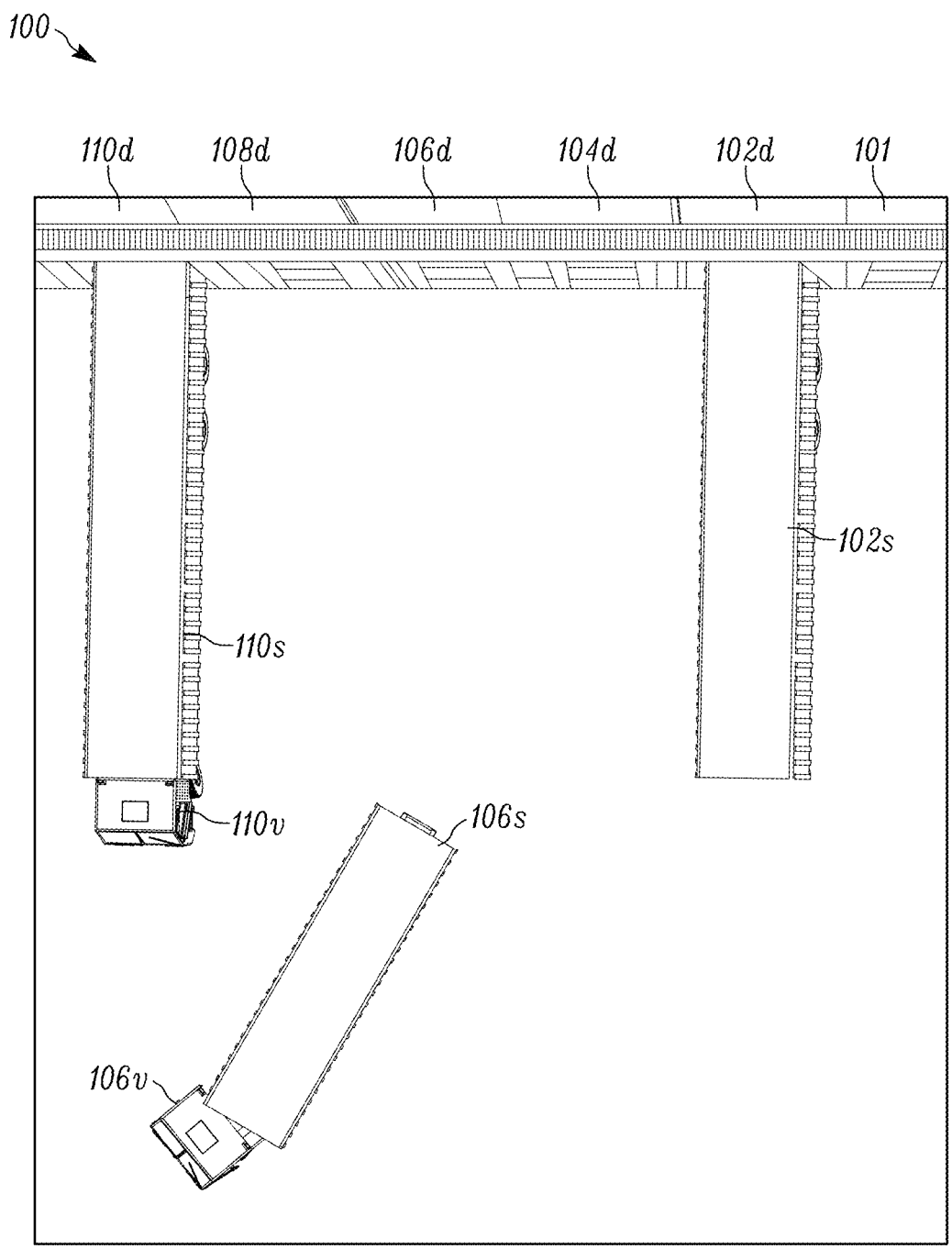
FIG. 1 is a perspective view, as seen from above, of a loading dock including a loading facility, a plurality of docking bays, a plurality of vehicles, and a plurality of vehicle storage areas, in accordance with example embodiments herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Systems and methods disclosed herein allow for the generation and display of 3D-image based images and metrics determined from 3D image data, including 3D image data of package walls, scanned over certain time periods. Using such systems and methods, users, such as loading dock managers, can view a detailed graph with 3D image data and segmentation metrics for each specific package wall that was constructed in a vehicle storage area. Metrics, such as wall quality, depth, and height can be reported on a wall-by-wall basis, over-time (and in real-time), giving users increased visibility into their loading operations. From the 3D imaging data, and other metrics described herein, users can provide better training to employees, and react in real-time to loading issues.

Accordingly, in various embodiments disclosed herein, 3D imaging systems and methods for segmenting and tracking package walls in commercial trailer loading are described. In various aspects, a 3D-depth camera may be configured to capture 3D image data. The 3D-depth camera may be oriented in a direction to capture the 3D image data of a vehicle storage area, where a first portion of the 3D image data is captured by the 3D-depth camera during a first time period, and where a second portion of the 3D image data is captured by the 3D-depth camera during a second time period. A segmentation application (app) executing on one or more processors may determine, based on the 3D image data, a first data wall slice corresponding to a first package wall, and a second data wall slice corresponding to a second package wall. The first package wall may be defined by a first plurality of packages each having a first similar depth dimension and each packed within the vehicle storage area during the first time period. Similarly, the second package wall may be defined by a second plurality of packages each having a second similar depth dimension and each packed within the vehicle storage area during the second time period.

FIG. 1 is a perspective view, as seen from above, of a loading dock 100 including a loading facility 101, a plurality of docking bays 102d-110d, a plurality of vehicles 106v and 110v, and a plurality of vehicle storage areas 102s-110s, in accordance with example embodiments herein. In some embodiments, loading dock 100 may, for example, be associated with a retail store, a wholesale store, or other such commercial building. In other embodiments, loading dock 100 may be associated with a storage facility, or waypoint facility, for housing packages, boxes, or other transportable objects or goods typically involved in distribution and logistics of such transportable objects or goods. Additional embodiments are contemplated herein such that loading dock 100 accommodates the loading and unloading of transportable objects or goods at a store, a facility, or other such similar location.

For example, FIG. 1 depicts loading facility 101, which, as described, may be a retail store, a storage facility, or other such similar location that accommodates the loading and unloading of transportable objects or goods. Loading facility 101 includes a plurality of docking bays 102d-110d. For example, docking bay 104d is depicted as undocked, and includes an opening of a size equal to or similar to that of an opening of a vehicle storage area. As depicted in FIG. 1, docking bay 104d may further include padding or insulation to receive a trailer (e.g., a vehicle storage area) against the wall of the loading facility 101. Docking bay 104d may further include a retractable door positioned within the opening of docking bay 104d, where the door may be opened to provide access to the vehicle storage area of a trailer from the loading facility 101. As described herein, docking bay 104d is representative of the remaining depicted docking bays, such as docking bays 102d, 106d, 108d, and 110d, where docking bays 102d, 106d, 108d, and 110d may have similar features or functionality as described herein for docking bay 104d.

In various embodiments, an opening of a vehicle storage area may be the opening of a trailer, where the trailer may be hauled by a semi, tractor-trailer, truck, or other such vehicle capable of hitching and moving a trailer (e.g., vehicle storage area), as described herein. In some embodiments the floor of a trailer, when docked, may be flush, or approximately flush, with the floor of a docking bay (e.g., docking bays 102d-110d) of loading facility 101.

FIG. 1 also depicts a plurality of vehicle storage areas 102s, 106s, and 110s. Vehicle storage areas 102s, 106s, and 110s may each be storage areas associated with a vehicle, for example, a trailer or other transportable storage area (e.g., 102s, 106s, and 110s) associated with a semi, tractor-trailer, truck, or other such large vehicle (e.g., 106v and 110v) as described herein. For example, as shown in FIG. 1, each of the vehicles 106v and 110v are associated with vehicle storage areas 106s and 110s respectively. Each of the vehicles 106v and 110v may be responsible for maneuvering their respective vehicle storage areas 106s and 110s to respective docking bays, such as docketing bays 106d and 110d.

As described herein, each of the vehicle storage areas 102s, 106s, and 110s include openings, generally at one end, that are of the same or similar size to the openings of the docking bays 102d-110d. In this way, the vehicle storage areas 102s, 106s, and 110s may interface with, or dock with, the docking bays 102d-110d in order to accommodate the loading and unloading of packages, boxes, or other transportable objects or goods as described herein. For example, as shown in FIG. 1, vehicle storage area 102s is depicted as a trailer that is docked with docking bay 102d. Accordingly, the opening of vehicle storage area 102s interfaces with the opening of docking bay 102d such that the interior of vehicle storage area 102s may be viewed or accessed from docking bay 102d. Similarly, vehicle storage area 110s is also depicted as a trailer that is docked with docking bay 110d, where the opening of vehicle storage areas 110s interfaces with the opening of docking bay 110d such that the interior of vehicle storage areas 110s may be viewed or accessed from docking bay 110d. Vehicle storage area 106s is depicted as currently not docked with respect to docking bay 106d.

Vehicle storage areas, such as 102s, 106s, and 110s, may have different sizes, lengths, or otherwise dimensions. For example, in one embodiment, the vehicle storage area 102s may be associated with a 63 foot long trailer, vehicle storage area may be associated with a 53 foot long trailer, and vehicle storage area 110s may be associated with a 73 foot long trailer. Other variations of vehicle storage area dimensions, sizes, and/or lengths are contemplated herein.

Figure 2A:
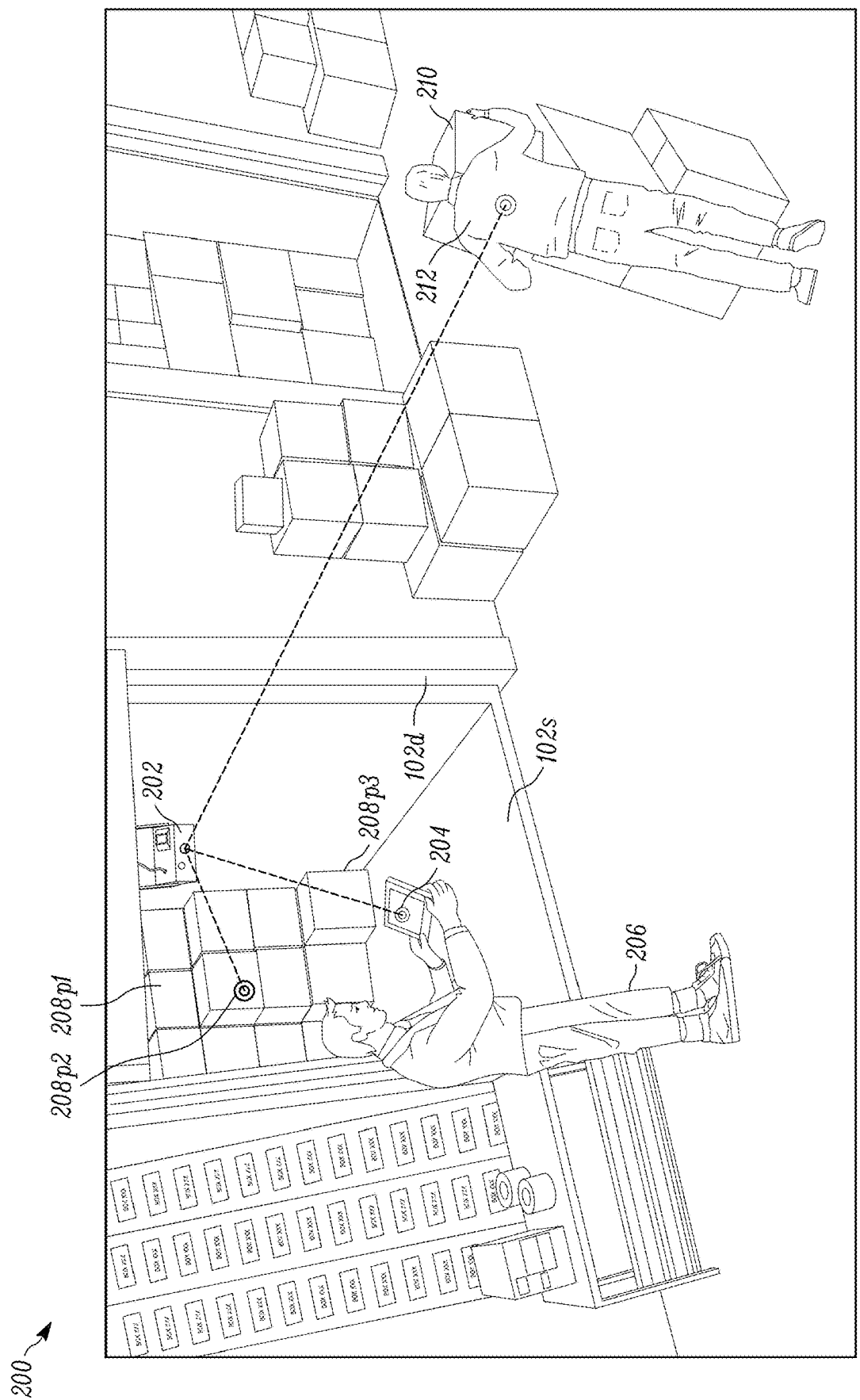
FIG. 2A is a perspective view of the loading facility of FIG. 1 depicting a vehicle storage area docked at a docking bay, in accordance with example embodiments herein.

FIG. 2A is a perspective view 200 of the loading facility 101 of FIG. 1 depicting vehicle storage area 102s docked at a docking bay 102d, in accordance with example embodiments herein. For example, FIG. 2A depicts vehicle storage area 102s, which in the embodiment of FIG. 2A is an interior view of the vehicle storage area 102s of FIG. 1. FIG. 2A also depicts docking bay 102d, which in the embodiment of FIG. 2A is an interior view of the docking bay 102d of FIG. 1. As depicted in FIG. 2A, vehicle storage area 102s is docked with docking bay 102d exposing the interior of vehicle storage area 102s to the interior of loading facility 101. Vehicle storage area 102s includes packages, boxes, and/or other transportable objects or goods, including packages 208p1-208p3, which may, in some embodiments, correspond to package walls, as described herein. The packages 208p1-208p3 may be in a state of being loaded or unloaded into vehicle storage area 102s. For example, worker 212 may be in a state of loading or unloading additional packages 210 into or out of vehicle storage area 102s. In some embodiments, manager 206 may oversee, assist, or otherwise additionally facilitate the loading or unloading packages, boxes, and/or other transportable objects or goods (e.g., packages 208p1-208p3 or 210) into or out of the vehicle storage area 102s. For example, manager 206 may utilize a dashboard app executing on client device 204 as described herein.

FIG. 2A also depicts a trailer monitoring unit (TMU) 202. TMU 202 may be a mountable device that includes a 3D-depth camera for capturing 3D images (e.g., 3D image data) and a photo-realistic camera (e.g., 2D image data). The photo-realistic camera may be an RGB (red, green, blue) camera for capturing 2D images. The TMU 202 may also include one or more processors and one or more computer memories for storing image data, and/or for executing apps that perform analytics or other functions as described herein. In various embodiments, and as shown in FIG. 2A, the TMU 202 may be mounted within loading facility 101 and oriented in the direction of vehicle storage area 102s to capture 3D and/or 2D image data of the interior of vehicle storage area 102s. For example, as shown in FIG. 2A, TMU 202 may be oriented such that the 3D and 2D cameras of TMU 202 look down the length of the vehicle storage area 102s so that TMU 202 may scan or sense the walls, floor, ceiling, packages (e.g., 208p1-208p3 or 210), or other objects or surfaces with vehicle storage area 102s to determine the 3D and 2D image data. The image data may be processed by the one or more processors and/or memories of the TMU 202 (or, in some embodiments, one or more remote processors and/or memories of a server) to implement analysis, functions, such as graphical or imaging analytics, as described by the one or more various flowcharts, block diagrams, methods, functions, or various embodiments herein.

In some embodiments, for example, the TMU 202 may process the 3D and 2D image data, as scanned or sensed from the 3D-depth camera and photo-realistic camera, for use by other devices (e.g., client device 204, or server 301 as further described herein). For example, the one or more processors and/or one or more memories of the TMU 202 may process the image data scanned or sensed from vehicle storage area 102*s*. The processing of the image data may generate post-scanning data that may include metadata, simplified data, normalized data, result data, status data, or alert data as determined from the original scanned or sensed image data. In some embodiments, the image data and/or the post-scanning data may be sent to a client application, such as a dashboard application (app) described herein, for viewing, manipulation, or otherwise interaction. In other embodiments, the image data and/or the post-scanning data may be sent to a server (e.g., server 301 as further described herein) for storage or for further manipulation.

As shown in FIG. 2A, the image data and/or the post-scanning data may be received on client device 204. Client device 204 may implement a dashboard app to receive the image data and/or the post-scanning data and display such data, e.g., in graphical or other format, to manager 206 to facilitate the unloading or loading of packages (e.g., 208*p*1-208*p*3 or 210), as described herein. In some embodiments, dashboard app may be implemented via a web platform such as Java J2EE (e.g., Java Server Faces) or Ruby on Rails. In such embodiments, the web platform may generate or update a user interface of the dashboard app via generation of a dynamic webpage (e.g., using HTML, CSS, JavaScript) or via a client-facing mobile app (e.g., via Java for a Google Android based app or Objective-C/Swift for an Apple iOS based app), where the user interface is displayed via the dashboard app on the client device, e.g., client device 204.

In some embodiments, the dashboard app may receive the image data and/or the post-scanning data and display such data in real-time. Client device 204 may be a mobile device, such as a tablet, smartphone, laptop, or other such mobile computing device. Client device 204 may implement an operating system or platform for executing the dashboard (or other) apps or functionality, including, for example, any of the Apple iOS platform, the Google Android platform, and/or the Microsoft Windows platform. Client device 204 may include one or more processors and/or one or more memories implementing the dashboard app or for providing other similar functionality. Client device 204 may also include wired or wireless transceivers for receiving image data and/or post-scanning data as described herein. Such wired or wireless transceivers may implement one or more communication protocol standards including, for example, TCP/IP, WiFi (802.11b), Bluetooth, or any other similar communication protocols or standards.

In some embodiments, the image data and/or the post-scanning data may be sent to a server or server, such as server 301 described herein. In such embodiments, the server or server may generate post-scanning data, that may include metadata, simplified data, normalized data, result data, status data, or alert data as determined from the original scanned or sensed image data provided by the TMU 202. As described herein, the server or centralized may store such data, and may also send the image data and/or the post-scanning data to a dashboard app, or other app, implemented on client device, such as the dashboard app implemented on client device 204 of FIG. 2A.

Figure 2B:
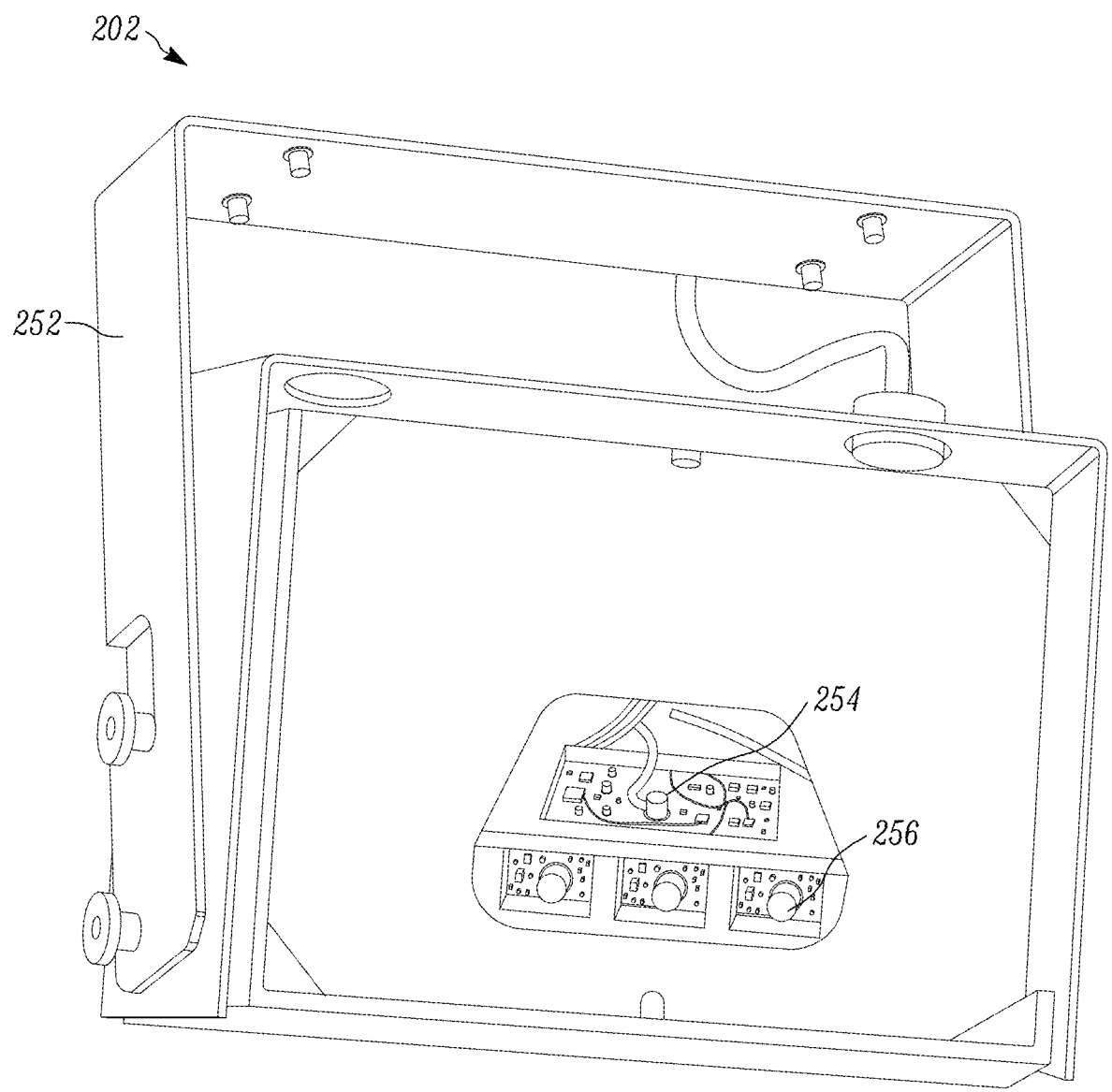
FIG. 2B is a perspective view of a trailer monitoring unit (TMU) of FIG. 2A, in accordance with example embodiments herein.

FIG. 2B is a perspective view of the TMU 202 of FIG. 2A, in accordance with example embodiments herein. In the example embodiment of FIG. 2B, TMU 202 may include a mounting bracket 252 for orienting or otherwise positioning the TMU 202 within loading facility 101 as described herein. The TMU 202 may further include one or more processors and one or more memories for processing image data as described herein. For example, the TMU 202 may include flash memory used for determining, storing, or otherwise processing the imaging data and/or post-scanning data. In addition, TMU 202 may further include a network interface to enable communication with other devices (such as server 301 of FIG. 3 as described herein). The network interface of TMU 202 may include any suitable type of communication interface(s) (e.g., wired and/or wireless interfaces) configured to operate in accordance with any suitable protocol(s), e.g., Ethernet for wired communications and/or IEEE 802.11 for wireless communications.

TMU 202 may include a 3D-depth camera 254 for capturing, sensing, or scanning 3D image data. For example, in some embodiments, the 3D-depth camera 254 may include an Infra-Red (IR) projector and a related IR camera. In such embodiments, the IR projector projects a pattern of IR light or beams onto an object or surface, which, in various embodiments herein, may include surfaces of a vehicle storage area (e.g., vehicle storage area 102*s*) or objects within the vehicle storage area, such as boxes or packages (e.g., packages 208*p*1-208*p*3 or 210). The IR light or beams may be distributed on the object or surface in a pattern of dots or points by the IR projector, which may be sensed or scanned by the IR camera. A depth-detection app, such as a depth-detection app executing on the one or more processors or memories of TMU 202, can determine, based on the pattern of dots or points, various depth values, for example, depth values of vehicle storage area 102*s*. For example, a near-depth object (e.g., nearby boxes, packages, etc.) may be determined where the dots or points are dense, and distant-depth objects (e.g., far boxes, packages, etc.) may be determined where the points are more spread out. The various depth values may be used by the depth-detection app and/or TMU 202 to generate a depth map. The depth map may represent a 3D image of, or contain 3D image data of, the objects or surfaces that were sensed or scanned by the 3D-depth camera 254, for example, the vehicle storage area 102*s* and any objects or surfaces therein.

The TMU 202 may further include a photo-realistic camera 256 for capturing, sensing, or scanning 2D image data. The photo-realistic camera 256 may be an RGB (red, green, blue) based camera for capturing 2D images having RGB-based pixel data. In some embodiments, the photo-realistic camera 256 may capture 2D images, and related 2D image data, at the same or similar point in time as the 3D-depth camera 254 such that the TMU 202 can have both sets of 3D image data and 2D image data available for a particular surface, object, or scene at the same or similar instance in time.

Figure 3:
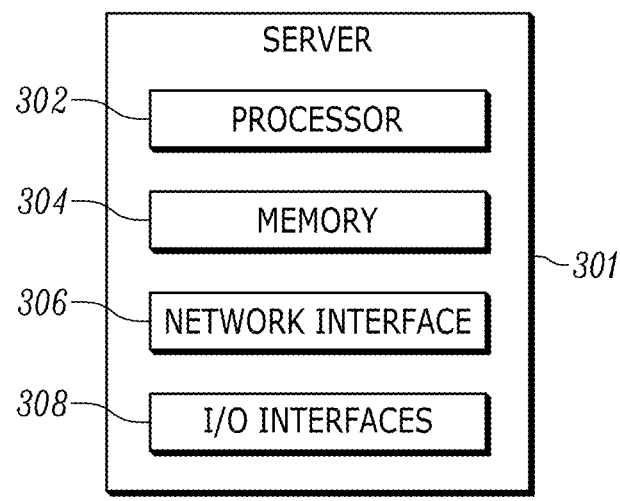
FIG. 3 is a block diagram representative of an embodiment of a server associated with the loading facility of FIG. 2A and the TMU of FIG. 2B.

FIG. 3 is a block diagram representative of an embodiment of a server associated with the loading facility 101 of FIG. 2A. In some embodiments, server 301 may be located in the same facility as loading facility 101. In other embodiments, server 301 may be located at a remote location, such as on a cloud-platform or other remote location. In either embodiment, server 301 may be communicatively coupled to a 3D-depth camera (e.g., TMU 202).

Server 301 is configured to execute computer instructions to perform operations associated with the systems and methods as described herein, for example, implement the example operations represented by the block diagrams or flowcharts of the drawings accompanying this description. The server 301 may implement enterprise service software that may include, for example, RESTful (representational state transfer) API services, message queuing service, and event services that may be provided by various platforms or specifications, such as the J2EE specification implemented by any one of the Oracle WebLogic Server platform, the JBoss platform, or the IBM Web Sphere platform, etc. Other technologies or platforms, such as Ruby on Rails, Microsoft .NET, or similar may also be used. As described below, the server 301 may be specifically configured for performing operations represented by the block diagrams or flowcharts of the drawings described herein.

The example server 301 of FIG. 3 includes a processor 302, such as, for example, one or more microprocessors, controllers, and/or any suitable type of processor. The example server 301 of FIG. 3 further includes memory (e.g., volatile memory or non-volatile memory) 304 accessible by the processor 302, for example, via a memory controller (not shown). The example processor 302 interacts with the memory 304 to obtain, for example, machine-readable instructions stored in the memory 304 corresponding to, for example, the operations represented by the flowcharts of this disclosure. Additionally or alternatively, machine-readable instructions corresponding to the example operations of the block diagrams or flowcharts may be stored on one or more removable media (e.g., a compact disc, a digital versatile disc, removable flash memory, etc.), or over a remote connection, such as the Internet or a cloud-based connection, that may be coupled to the server 301 to provide access to the machine-readable instructions stored thereon.

The example server 301 of FIG. 3 may further include a network interface 306 to enable communication with other machines via, for example, one or more computer networks, such as a local area network (LAN) or a wide area network (WAN), e.g., the Internet. The example network interface 306 may include any suitable type of communication interface(s) (e.g., wired and/or wireless interfaces) configured to operate in accordance with any suitable protocol(s), e.g., Ethernet for wired communications and/or IEEE 802.11 for wireless communications.

The example server 301 of FIG. 3 includes input/output (I/O) interfaces 308 to enable receipt of user input and communication of output data to the user, which may include, for example, any number of keyboards, mice, USB drives, optical drives, screens, touchscreens, etc.

Figure 4:
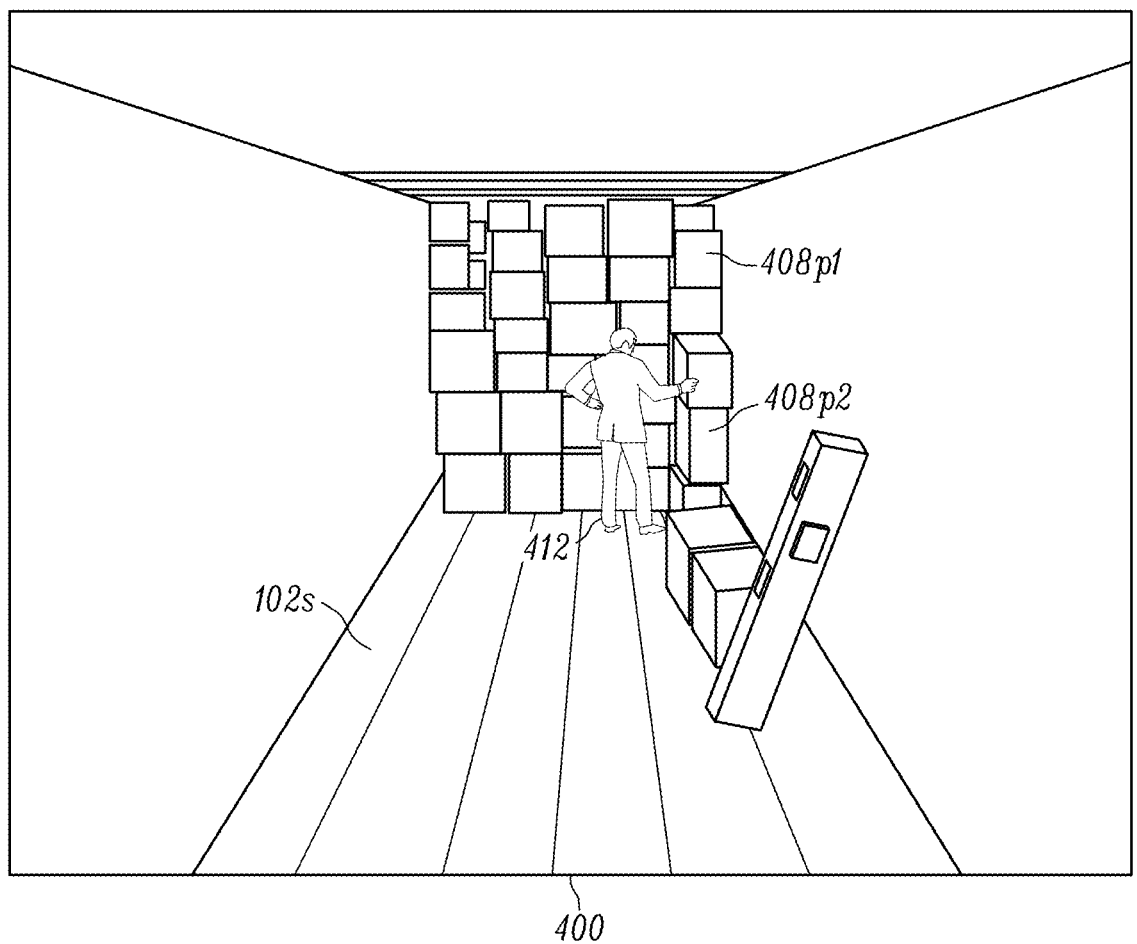
FIG. 4 is a photo-realistic view depicting the vehicle storage area docked at the docking bay of FIG. 2A where the vehicle storage area includes package walls.

FIG. 4 is a photo-realistic view depicting the vehicle storage area 102s docked at the docking bay 102d of FIG. 2A where the vehicle storage area 102s includes package walls 408p1 and 408p2. As used herein, a package wall may be a stack of packages, boxes, or other transportable objects or goods typically involved in distribution and logistics. A package wall may also be a single package that forms the foundation of a new package wall. Each of the packages, boxes, or other transportable objects or goods that make up a particular package wall may share a common depth, dimension, or length such that the particular package wall, as a whole, contains at least one uniform or approximately uniform depth, dimension, or length. For example, package wall 408p1 represents a fully stacked package wall that includes packages of a common depth, dimension, or length stacked from the floor to the ceiling of storage area 102s. As another example, package wall 408p2 represents a foundation of package wall that includes packages of a common depth, dimension, or length that are beginning to form a new package wall in front of package wall 408p1. For example, worker 412 may be in the process of stacking or loading package wall 408p2 into vehicle storage area 102s. In some embodiments, package walls 408p1 and 408p2 may correspond to any of the packages or package walls 208p1-208p3 of FIG. 2A as described herein. Similarly, worker 412 may correspond to worker 212 of FIG. 2A as described herein.

In the embodiment of FIG. 4, package walls 408p1 and 408p2 are located at the rear section of the vehicle storage area 102s, and are in-range of the 3D-depth camera (e.g., 3D-depth camera 254) as described herein. For example, and as depicted in FIG. 2A, the 3D-depth camera 254 is oriented in a direction to capture the 3D image data of the vehicle storage area 102s. In various embodiments, the 3D image data may be 3D point cloud data. Such point cloud data may be represented in a variety of formats, including the Polygon File Format (ply) or the Point Cloud Library Format (pcd). In additional embodiments, the 3D image data may be captured periodically, for example, such as every 30 seconds, every minute, or every two minutes, etc., but may be captured at any time frequency provided by the related 3D-depth camera, e.g., such as provided by TMU 202.

Figure 5A:
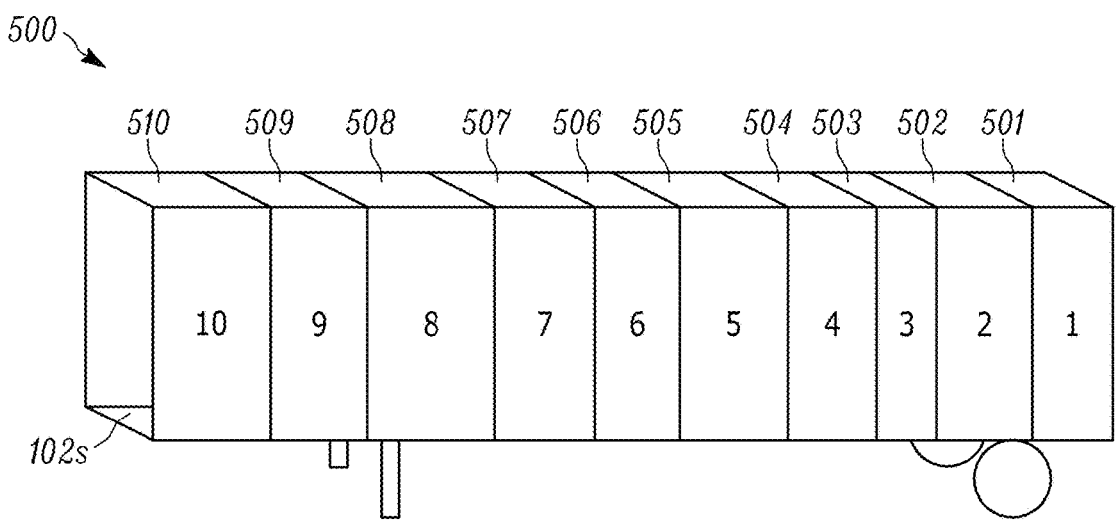
FIG. 5A is a side view diagram representing a trailer view of the vehicle storage area 102s of FIG. 4, and depicting a plurality of segmented package walls and corresponding package wall depths, in accordance with example embodiments herein.

FIG. 5A is a side view diagram representing a trailer view 500 of the vehicle storage area 102s of FIG. 4, and depicting a plurality of segmented package walls 501-510 and corresponding package wall depths, in accordance with example embodiments herein. Trailer view 500 shows the exterior of a representation of a trailer with the plurality of segmented package walls 501-510. The plurality of segmented package walls 501-510 may be logical segments representing, from an exterior perspective, the dimensions of corresponding package walls packed within vehicle storage area 102s. For example, as shown in trailer view 500, ten package walls (1-10) are represented as being packed within vehicle storage area 102s by the ten corresponding plurality of segmented package walls 501-510. In addition, each of the segmented package walls 501-510 includes a corresponding package wall depth. As described herein, a package wall is generally defined by a stack of boxes sharing at least one common or approximately common depth or dimension. In addition, each package wall may have different dimensions such that the depths or dimensions of the package walls vary within storage area 102s. For example, segmented package wall 510 that corresponds to a package wall 10 has a larger depth (i.e., a longer dimension as shown from the side of trailer view 500) than package wall 503 that corresponds to package wall 3 which has a smaller depth (i.e., a shorter dimension as shown from the side of trailer view 500).

In various embodiments, trailer view 500 may be generated for a graphical display. For example, in certain embodiments a dashboard app, as described herein, may generate and display a graphical representation of trailer view 500, which may include any permutation or of the segmented package walls 501-510 corresponding to the package walls (1-10) as arranged in the vehicle storage area 102s. Trailer view 500 may be based on data wall slices determined from 3D image data of vehicle storage area 102s captured over time via a 3D-depth camera (e.g., 3D-depth camera 254 of TMU 202), as described further herein.

Figure 5B:
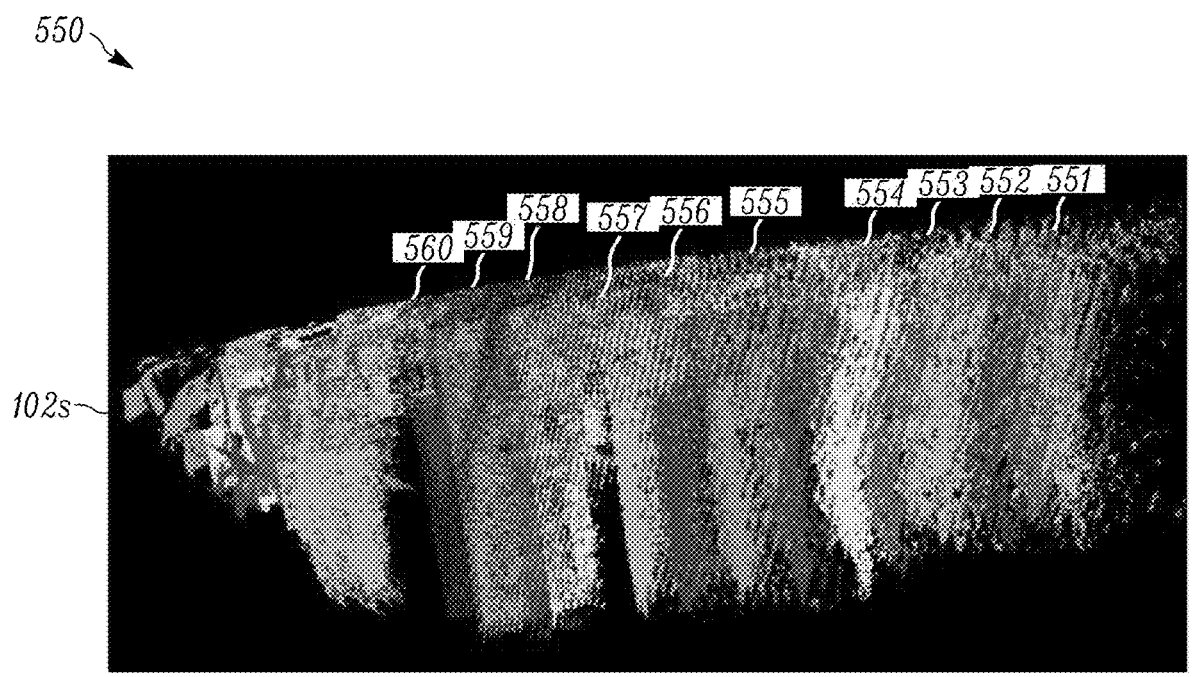
FIG. 5B is an embodiment of a depth-map rendering of a plurality of data wall slices corresponding to the segmented package walls of FIG. 5A.

FIG. 5B is an embodiment of a depth-map rendering 550 of a plurality of data wall slices 551-560 corresponding to the segmented package walls 501-510 of FIG. 5A. Each of the data wall slices 551-560 are rendered in different colors which corresponds to the segmentation and depth of the corresponding package walls. That is, each package wall slice 551-560 is rendered in different color pixels, thereby representing the actual segmentation of the package walls 1-10 corresponding to the segmented package walls 501-510 of FIG. 5A. For example, segmented package wall 501 (corresponding to package wall 1) may represent data wall slice 551 and is depicted as a blue pixel segment. As another example, segmented package wall 502 (corresponding to package wall 2) may represent data wall slice 552 and is depicted as a cyan pixel segment. As a still further example, segmented package wall 508 (corresponding to package wall 8) may represent data wall slice 558 and is depicted as a red pixel segment. As shown in the embodiment of FIG. 5B, the pixel colors for each data wall slice may be altered to show the segmentation of the package walls in the depth-map rendering 550.

Each of the data wall slices 551-560 represent 3D image data (e.g., point cloud data) captured over time as packages are loaded into vehicle storage area 102s and as package walls (e.g., package walls 1-10 of FIG. 5A) are constructed. For example, as describe herein, a 3D-depth camera (e.g., 3D-depth camera 254 of TMU 202) may be oriented in a direction to capture 3D image data of the vehicle storage area 102s. As packages are moved into the vehicle storage area 102s, and as package walls are constructed therein, the 3D-depth camera will capture 3D image data of each package moved within vehicle storage area 102s and each package wall constructed therein overtime. The 3D image data may be stored in one or more memories (e.g., in one or more memories of TMU 202 or in one or more memories of server 301) when it is captured, and in some embodiments, may be stored together with a timestamp of when the 3D image data was captured.

A segmentation application (app) executing one or more processors (e.g., one or more processors of TMU 202 or one or more processors of server 301) may then determine, based on the captured 3D-image data and/or timestamps, the segmentation of data wall slices which correspond and relate to the package walls constructed overtime within vehicle storage area 102s. For example, segmentation app may analyze the 3D-image data overtime (e.g., in in real-time) to track the distances or depths of package walls in the vehicle storage area 102s while the package walls are being constructed. Based on the 3D-image tracked overtime, the segmentation app detects changes in the reported distance to a given package wall, and can determine, based on a change in distance, whether an existing (e.g., first) wall is still being constructed or whether a new (e.g., second) wall has started to be constructed. That is, the segmentation app can analyze the depth values in the 3D-image data to determine if the depth reported is part of an existing stored wall, or comprises a new wall. If the segmentation app, analyzing the depth values of the 3D-image data, determines that a new wall has started to be constructed, then the segmentation app adds it to the number of package walls detected in within vehicle storage area 102s. Otherwise, the segmentation app may continue to track and store 3D-image data of an existing package wall, e.g., by taking a weighted average of the current reported depth and the current stored depth for the existing wall, thereby generating 3D-image data defining the shape and dimensions of the data wall slice for that existing package wall within the vehicle storage area 102s. In this way, a list of walls, including the dimensions and depths of such walls, may be determined and tracked within vehicle storage area 102s overtime. Once the process is complete, a graphical representation, such as trailer view 500, may be generated to show the specific dimensions, depths, or other metrics of each package wall loaded and constructed within vehicle storage area 102s. Accordingly, segmentation app, by analyzing the 3D-image data of vehicle storage area 102s, is able to separate out package walls (e.g., as depicted in FIG. 5A), keep track of package walls and their associated metrics, and construct 3D-image data wall slices of each package wall (e.g., as depicted in FIG. 5B, and FIGS. 6A and 6B, as described further herein).

Tracking and segmenting package walls via data wall slices offers provides various benefits over current methods. For example, once package walls have been identified and segmented, as describe herein, various metrics can be calculated, such as the thickness of the wall, the height of the wall, the percent utilization of the wall, etc. Such metrics can be associated with specific walls (e.g., package walls 1-10 of FIG. 5A), allowing for the 3D-image data, including the specific segmentation data, and related post-processing data, to be presented in different fashions to end-users (e.g., manager 206). For example, such data may be presented in bar graph format, or other formats, e.g., the trailer view 500 of FIG. 5A. With these metrics, end-users can know and discover details about each of the package walls of a loaded vehicle storage area, permitting for better space utilization and/or employee training.

Figure 6A:
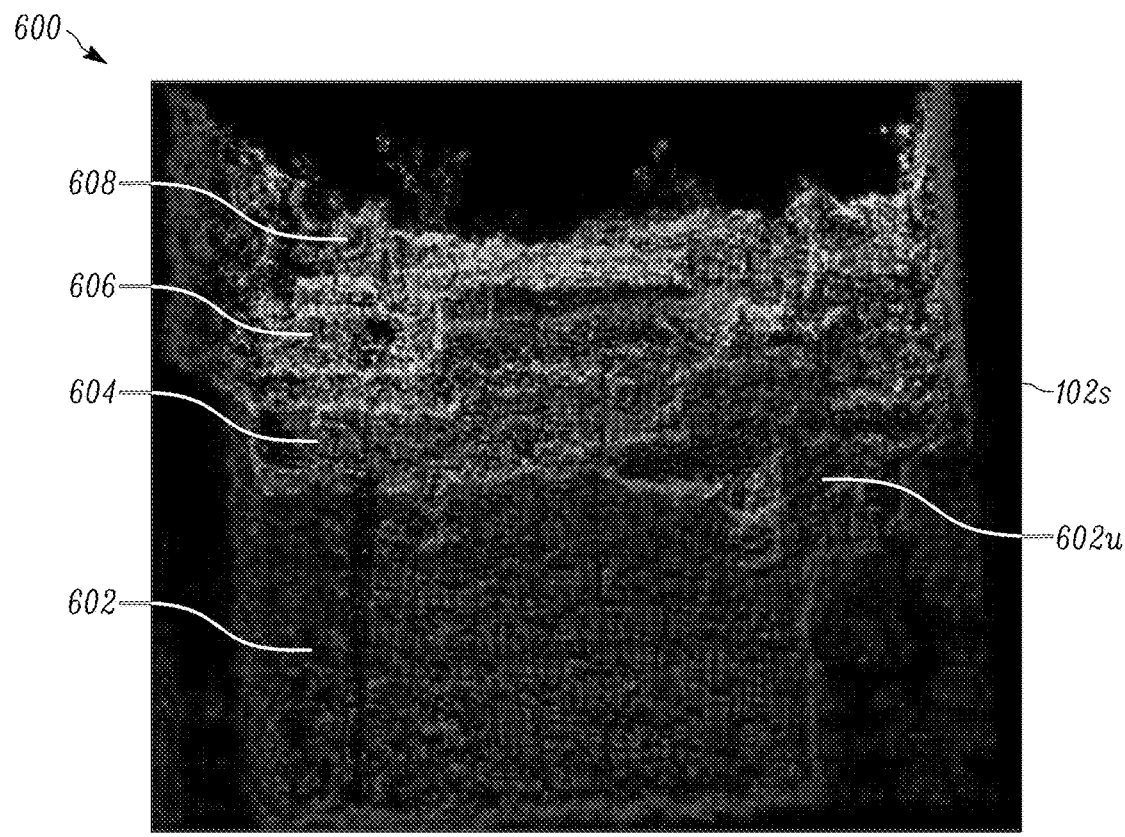
FIG. 6A is a first embodiment of a depth-map rendering depicting a cross section view of the vehicle storage area of FIG. 5A and a plurality of data wall slices at a first time period.
Figure 6B:
FIG. 6B is a second embodiment of a depth-map rendering depicting a cross section view of the vehicle storage area of FIG. 5A and the plurality of data wall slices of FIG. 6A at a second time period.

FIG. 6A is a first embodiment of a depth-map rendering 600 depicting a cross section view of the vehicle storage area 102s of FIG. 5A and a plurality of data wall slices 602-608 at a first time period. The cross section view of depth-map rendering 600 represents the view from the 3D-depth camera (e.g., TMU 202) as looking into, and down the length of, the vehicle storage 102s at the first time period. Each of the a plurality of data wall slices 602-608 may correspond to a front view of a data wall slice of FIG. 5B, for example, including any of data wall slices 551-560. For example, data wall slice 602 may correspond to a front view of data wall slice 554, which represents the front of package wall 4 (segmented package wall 504) of FIG. 5A. Similarly, each of data wall slices 604, 606, and 608 may correspond to the front of data wall slices 553, 552, and 551, respectively, which represents package walls 3, 2, and 1 (segmented package walls 503-501), respectively, of FIG. 5A. As depicted in depth-map rendering 600, each of the various data wall slices 602,604, 606, and 608 are stacked next to each other such that the rendering of the front most data wall slice (i.e., data wall slice 602), which is nearest to the 3D-depth camera (e.g., 3D-depth camera 254 of TMU 202), covers up or at least partially hides the other data wall slices 604-608. Similarly, the next data wall slice (i.e., 604 data wall slice 602), which is the next nearest data wall slice to the 3D-depth camera (e.g., 3D-depth camera 254 of TMU 202), covers up or at least partially hides the remaining data wall slices 606-608, etc. Accordingly, depth-map rendering 600 depicts the current state of various package walls within the vehicle storage area 102s at the first time period, where nearer package walls may cover up or partially hide further package walls.

As depicted in depth-map rendering 600, each dot, point, or pixel represents a point in 3D space. Each of the dots, points, or pixels are determined from the 3D image data (e.g., point cloud data) detected or sensed by a 3D-depth camera (e.g., 3D-depth camera 254 of TMU 202). As shown in the embodiment of depth-map rendering 600, red points (e.g., of data wall slice 602) represent objects or surfaces (e.g., package wall 4) closest to the 3D-depth camera. Green points (e.g., of data wall slice 608) represent objects or surfaces furthest away (e.g., package wall 1). Orange and yellow points (e.g., of data wall slices 604 and 606) represent objects or surfaces (e.g., package walls 3 and 4, respectively) in between. By combining the various points or dots together, reliable data wall slices can be generated or determined without occlusions. For example, each data wall slice may be represented as a whole segment without large black holes, or large void data regions, in any of the wall slices. Accordingly, each a depth-map rendering can accurately represent the size, height, depth, overall dimensions, or other metrics, of each data wall slice corresponding to a package wall loaded into the vehicle storage area 102s.

In various embodiments, the segmentation app may identify and filter extraneous items placed in front of the package walls being constructed within the vehicle storage area 102s. As described herein, in order to develop metrics on a wall-by-wall basis, the segmentation app may create and maintain data wall slices for each package wall. The segmentation app may remove any extraneous points that are in front of an identified package wall such that such points do not become associated with part of the identified package wall. Such extraneous points could include 3D-image data points detected based on individuals (e.g., worker 412) moving within the vehicle storage area 102s, lose boxes that are not yet being stacked to form a package wall, partial walls, etc.

As new 3D-image data (e.g., point cloud data) is processed and is determined to belong to the same package wall/data wall slice, such 3D-image data may be combined together using filters, k-d trees, and nearest neighbor algorithms and searches to properly align the points. For example, in some embodiments, 3D-image data may be generated on a per data frame basis, where each data frame contains 3D-image data at a particular point in time. 3D-image data captured in one data frame may be combined with 3D-image data of another data frame using filters, k-d trees, and nearest neighbor algorithms. By combining the 3D-image data, if a part of a package wall is occluded in a first data frame, but is present in second data frame, the occluded data portion in the first data frame can still be included in a data wall slice via a combination of 3D-image data from the second data frame. Additionally, as holes in a package wall are filled in (e.g., by adding new packages to the package wall), the data wall slice can be adjusted to ensure the most recent data is maintained at all times. For example, data wall slice portion 602u of data wall slice 602 could represent an updated portion of the data wall slice 602 where a new package was added to the related package wall (e.g., package wall 4 corresponding to segmented package wall 504 of FIG. 5A) at a later time.

FIG. 6B is a second embodiment of a depth-map rendering 650 depicting a cross section view of the vehicle storage area 102s of FIG. 5A and the plurality of data wall slices 602-606 of FIG. 6A at a second time period. As for depth-map rendering 600, depth-map rendering 650 represents the view from the 3D-depth camera (e.g., TMU 202) as looking into, and down the length of, the vehicle storage 102s, but at the second time period. At the second time period, data wall slice 608 (as shown via green data points in depth-map rendering 600) is completely hidden from view by each of data wall slices 602-606. In addition, most of data wall slices 604 and 606 (orange and yellow data points, respectively) are obstructed from view. Moreover, data wall slice 602 is now higher than it was in depth-map rendering 600, representing a more fully stacked or constructed, package wall. Accordingly, the second time period of depth-map rendering 650 may represent a point in time later than the first time period of depth-map rendering 600, where each of the package walls 602-608 have been further constructed or developed. It will be noted that, even though data wall slice 608 is hidden from view as shown in depth-map rendering 650, each of the data points of data wall slice 608 (and its related dimensions or other metrics) are stored, or otherwise maintained, (e.g., by TMU 202 or server 301) for use or other manipulation, such as graphical depiction (e.g., FIGS. 5A and/or 5B) as described herein.

Figure 7:
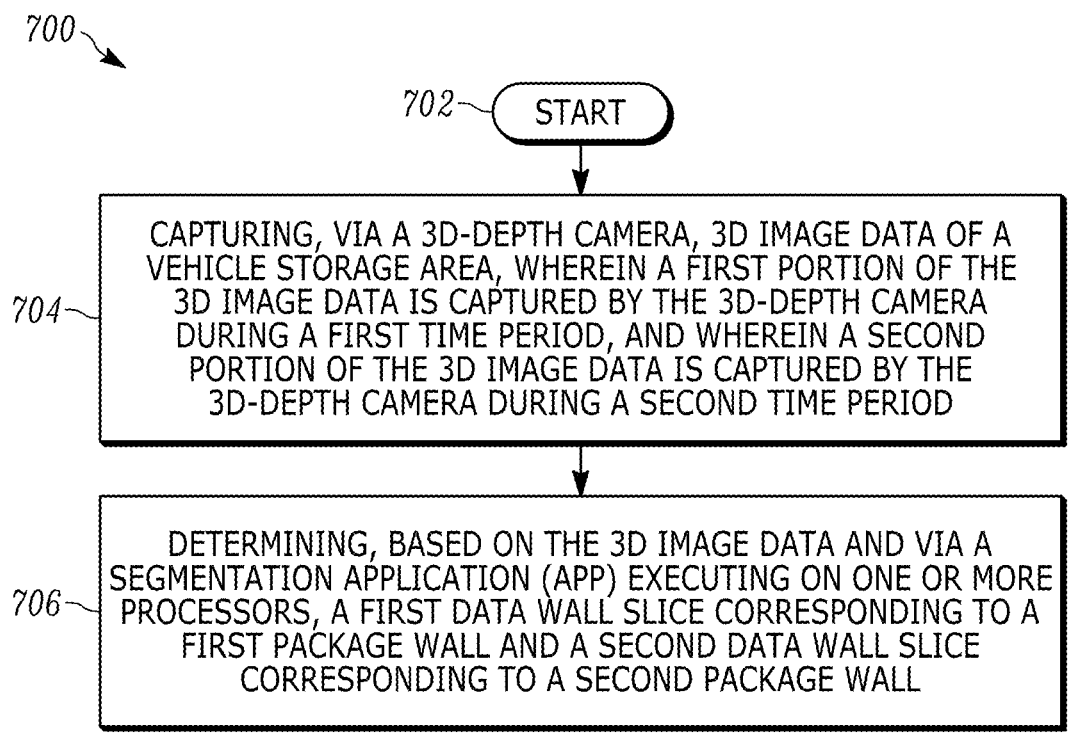
FIG. 7 is a flow chart of a 3D imaging method for segmenting and tracking package walls in commercial trailer loading.

FIG. 7 is a flow chart of a 3D imaging method 700 for segmenting and tracking package walls in commercial trailer loading. Method 700 begins (702) at block 704 where a 3D-depth camera (e.g., 3D-depth camera 254 of TMU 202), oriented in a direction of a vehicle storage area (e.g., vehicle storage area 102s), captures 3D image data of the vehicle storage area. As described herein, the 3D-depth camera may be housed in a mountable device (such as shown in FIG. 2B) and mounted within loading facility 101. A first portion of the 3D image data is captured by the 3D-depth camera during a first time period. In addition, a second portion of the 3D image data is captured by the 3D-depth camera during a second time period. In some embodiments, the first time period may precede the second time period such that the first package wall (e.g., package wall 1 as represented by data wall slice 551 or 608) is at least partially hidden from the 3D-depth camera by the second package wall (e.g., package wall 2 as represented by data wall slice 552 or 606).

At block 706, a segmentation app executing on one or more processors determines, based on the 3D image data, a first data wall slice (e.g., data wall slice 551 or 608) corresponding to a first package wall (e.g., package wall 1 of FIG. 5A) and a second data wall slice (e.g., data wall slice 552 or 606) corresponding to a second package wall (e.g., package wall 2 of FIG. 5A). As described herein, the first package wall (e.g., package wall 1 of FIG. 5A) may be defined by a first plurality of packages each having a first similar depth dimension and each packed within the vehicle storage area 102s during the first time period. Similarly, the second package wall (e.g., package wall 2 of FIG. 5A) may be defined by a second plurality of packages each having a second similar depth dimension and each packed within the vehicle storage area during the second time period.

In various embodiments, the first data wall slice or the second data wall slice may be updated based on additional 3D image data captured for the first package wall or the second package wall, respectively. For example, an additional package may be added to the first or second package wall causing the 3D image data for that data wall slice to be updated.

In some embodiments, the segmentation app may track a total number of data wall slices corresponding to a total number of package walls packed within the vehicle storage area. In this way, a list of package walls may be developed and tracked overtime. For example, FIGS. 5A and 5B may correspond to graphical representations of the list of package walls developed and tracked over a time period that vehicle storage 102s was loaded.

In one embodiment, the segmentation app may be executed on the one or more processors of the TMU 202, where the TMU 202 analyzes the 3D-image data and determines the data wall slices and/or other metrics as described herein. In another embodiment, the segmentation app may be executed on one or more processors of server 301 (e.g., processor 302), where server 301 determines the data wall slices and/or other metrics as described herein. In still further embodiments, the TMU 202 and the server 301 may, together, determine the data wall slices and/or other metrics, where for example, TMU 202 does a portion of the processing and the server 301 performs additional or other processing.

Some embodiments may include a dashboard app executing on a client device, e.g., such as client device 204 described herein. For example, a dashboard app executing on the client device may receive segmentation metrics. The segmentation metrics may be associated with at least one of the first data wall slice or the second data wall slice. The segmentation metrics may include metrics, metadata, result data, or other information that may include a wall identifier (ID) identifying a particular data wall slice (e.g., wall ID "1"

identifying package wall 1 of FIG. 5A), a wall height value of the particular data wall slice (e.g., a height value of data wall slice 608), and a wall depth value of the particular data wall slice (e.g., a wall depth value of data wall slice 602).

In some embodiments, the dashboard app may display, on the client device, a graphical representation of the first package wall and the second package wall as arranged in the vehicle storage area where the graphical representation is based on the first data wall slice and the second data wall slice. For example, the graphical representation can include either of the trailer view 500 of FIG. 5A or depth-map rendering 550 of FIG. 5B.

In still further embodiments, the segmentation metrics may be received at a server (e.g., server 301), where the server 301 is communicatively coupled to the TMU 202, as described herein. In such embodiments, the server may transmit the segmentation metrics to the dashboard app. In some embodiments, the server 301 may store the segmentation metrics in one or more memories (e.g., memory 304).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A three-dimensional (3D) imaging system for segmenting and tracking package walls in commercial trailer loading, the 3D imaging system comprising:
    a 3D-depth camera configured to capture 3D image data, the 3D-depth camera oriented in a direction to capture 3D image data of a vehicle storage area, wherein a first portion of the 3D image data is captured by the 3D-depth camera during a first time period, and wherein a second portion of the 3D image data is captured by the 3D-depth camera during a second time period; and a segmentation application (app) executing on one or more processors, the segmentation app determining, based on the 3D image data, a first data wall slice corresponding to a first package wall and a second data wall slice corresponding to a second package wall, wherein the first package wall is defined by a first plurality of packages each having a first similar depth dimension and each packed within the vehicle storage area during the first time period, and wherein the second package wall is defined by a second plurality of packages each having a second similar depth dimension and each packed within the vehicle storage area during the second time period.

2. The 3D imaging system of claim 1, wherein the 3D-depth camera and the one or more processors are housed in a mountable device.

3. The 3D imaging system of claim 1, wherein the first time period precedes the second time period, and wherein the first package wall is at least partially hidden from the 3D-depth camera by the second package wall.

4. The 3D imaging system of claim 1, wherein the segmentation app tracks a total number of data wall slices corresponding to a total number of package walls packed within the vehicle storage area.

5. The 3D imaging system of claim 1, wherein the first data wall slice is updated based on additional 3D image data captured for the first package wall.

6. The 3D imaging system of claim 1, wherein the second data wall slice is updated based on additional 3D image data captured for the second package wall.

7. The 3D imaging system of claim 1, further comprising a dashboard app, the dashboard app executing on a client device, and wherein the dashboard app receives segmentation metrics, the segmentation metrics associated with at least one of the first data wall slice or the second data wall slice.

8. The 3D imaging system of claim 7, wherein the dashboard app displays a graphical representation of the first package wall and the second package wall as arranged in the vehicle storage area, the graphical representation based on the first data wall slice and the second data wall slice.

9. The 3D imaging system of claim 7, wherein the segmentation metrics include a wall identifier (ID) identifying a particular data wall slice, a wall height value of the particular data wall slice, and a wall depth value of the particular data wall slice.

10. The 3D imaging system of claim 7 further comprising a server, the server communicatively coupled to the one or more processors, wherein the server receives the segmentation metrics from the one or more processors, and wherein the server transmits the segmentation metrics to the dashboard app.

11. The 3D imaging system of claim 10, wherein the server stores the segmentation metrics in one or more memories.

12. A three-dimensional (3D) imaging method for segmenting and tracking package walls in commercial trailer loading, the 3D imaging method comprising:

capturing, via a 3D-depth camera, 3D image data of a vehicle storage area, the 3D-depth camera oriented in a direction to capture the 3D image data of the vehicle storage area, wherein a first portion of the 3D image data is captured by the 3D-depth camera during a first time period, and wherein a second portion of the 3D image data is captured by the 3D-depth camera during a second time period; and determining, based on the 3D image data and via a segmentation application (app) executing on one or more processors, a first data wall slice corresponding to a first package wall and a second data wall slice corresponding to a second package wall, wherein the first package wall is defined by a first plurality of packages each having a first similar depth dimension and each packed within the vehicle storage area during the first time period, and wherein the second package wall is defined by a second plurality of packages each having a second similar depth dimension and each packed within the vehicle storage area during the second time period.

13. The 3D imaging method of claim 12, wherein the 3D-depth camera and the one or more processors are housed in a mountable device.

14. The 3D imaging method of claim 12, wherein the first time period precedes the second time period, and wherein the first package wall is at least partially hidden from the 3D-depth camera by the second package wall.

15. The 3D imaging method of claim 12, wherein the segmentation app tracks a total number of data wall slices corresponding to a total number of package walls packed within the vehicle storage area.

16. The 3D imaging method of claim 12, wherein the first data wall slice is updated based on additional 3D image data captured for the first package wall.

17. The 3D imaging method of claim 1, wherein the second data wall slice is updated based on additional 3D image data captured for the second package wall.

18. The 3D imaging method of claim 12 further comprising receiving, via a dashboard app executing on a client device, segmentation metrics, the segmentation metrics associated with at least one of the first data wall slice or the second data wall slice.

19. The 3D imaging method of claim 18, wherein the dashboard app displays a graphical representation of the first package wall and the second package wall as arranged in the vehicle storage area, the graphical representation based on the first data wall slice and the second data wall slice.

20. The 3D imaging method of claim 18, wherein the segmentation metrics include a wall identifier (ID) identifying a particular data wall slice, a wall height value of the particular data wall slice, and a wall depth value of the particular data wall slice.

21. The 3D imaging method of claim 19 further comprising receiving, at a server communicatively coupled to the one or more processors, the segmentation metrics, wherein the server transmits the segmentation metrics to the dashboard app.

22. The 3D imaging method of claim 21, wherein the server stores the segmentation metrics in one or more memories.

* * * * *